US011703238B2

(12) United States Patent
Uerkvitz et al.

(10) Patent No.: US 11,703,238 B2
(45) Date of Patent: Jul. 18, 2023

(54) REMOTE ACCESS CONTROL OF HVAC SYSTEM

(71) Applicant: Johnson Controls Technology Company, Auburn Hills, MI (US)

(72) Inventors: John W. Uerkvitz, Valley Center, KS (US); Theresa N. Gillette, Wichita, KS (US); Brian D. Rigg, Douglass, KS (US); Shaun B. Atchison, Wichita, KS (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 0 days.

(21) Appl. No.: 16/827,369

(22) Filed: Mar. 23, 2020

(65) Prior Publication Data

US 2021/0285668 A1    Sep. 16, 2021

Related U.S. Application Data

(60) Provisional application No. 62/988,753, filed on Mar. 12, 2020.

(51) Int. Cl.
| | |
|---|---|
| G05B 19/042 | (2006.01) |
| F24F 11/30 | (2018.01) |
| F24F 11/64 | (2018.01) |
| F24F 11/65 | (2018.01) |
| F24F 11/52 | (2018.01) |
| F24F 11/56 | (2018.01) |
| F24F 120/12 | (2018.01) |
| F24F 120/20 | (2018.01) |

(52) U.S. Cl.
CPC .............. *F24F 11/30* (2018.01); *F24F 11/52* (2018.01); *F24F 11/56* (2018.01); *F24F 11/64* (2018.01); *F24F 11/65* (2018.01); *G05B 19/0426* (2013.01); *F24F 2120/12* (2018.01); *F24F 2120/20* (2018.01); *G05B 2219/2614* (2013.01)

(58) Field of Classification Search
CPC ........ F24F 11/30; F24F 11/56; F24F 2120/12; G05B 2219/2614; H04W 4/029; H04W 4/80; H04W 4/02; H04W 64/00; H04W 12/06; H04W 12/08; H04W 48/08; H04W 4/027; H04W 36/32; H04W 48/02; H04W 48/04; H04W 4/025; H04W 12/082; H04W 12/61; H04W 12/65; G06F 2221/2137; G06F 2221/2111; G06F 9/485
See application file for complete search history.

(56) References Cited

U.S. PATENT DOCUMENTS

| | | | |
|---|---|---|---|
| 7,463,961 B2 * | 12/2008 | Powers | B60K 37/06 345/204 |
| 8,732,822 B2 * | 5/2014 | Schechter | G06F 21/629 455/418 |
| 9,107,075 B1 * | 8/2015 | Matsuoka | G06F 21/35 |
| 9,247,378 B2 | 1/2016 | Bisson et al. | |

(Continued)

*Primary Examiner* — Darrin D Dunn
(74) *Attorney, Agent, or Firm* — Fletcher Yoder, P.C.

(57) ABSTRACT

A non-transitory computer-readable storage medium for a heating, ventilation, and/or air conditioning (HVAC) system includes instructions that, when executed by a processor, cause the processor to receive an input indicative of a user location, perform a verification that the user location is within a determined distance from the HVAC system, and control access to system settings of the HVAC system based on the verification.

19 Claims, 7 Drawing Sheets

(56) References Cited

U.S. PATENT DOCUMENTS

| | | | |
|---|---|---|---|
| 9,588,506 B1* | 3/2017 | Clayton | G05B 15/02 |
| 9,594,384 B2 | 3/2017 | Bergman et al. | |
| 9,628,951 B1* | 4/2017 | Kolavennu | H04W 4/023 |
| 9,658,609 B2 | 5/2017 | Khiani et al. | |
| 9,823,672 B2 | 11/2017 | McCurnin et al. | |
| 9,939,824 B2* | 4/2018 | Nelson | F24F 11/30 |
| 9,985,629 B2* | 5/2018 | Schuh | G06F 3/04166 |
| 10,013,537 B1* | 7/2018 | Trachtman | G06F 21/31 |
| 10,057,354 B2* | 8/2018 | Barnett | H04L 67/143 |
| 10,063,387 B2 | 8/2018 | Bisson et al. | |
| 10,091,177 B1* | 10/2018 | Trachtman | H04W 12/30 |
| 10,133,283 B2 | 11/2018 | Bergman et al. | |
| 10,859,283 B1* | 12/2020 | Goodman | G05D 23/1932 |
| 10,869,090 B2* | 12/2020 | Gonzalez | H04N 21/44218 |
| 2009/0065578 A1* | 3/2009 | Peterson | G05B 19/409 |
| | | | 235/382 |
| 2013/0160110 A1* | 6/2013 | Schechter | G06F 21/629 |
| | | | 726/19 |
| 2013/0331128 A1* | 12/2013 | Qiu | G01S 5/0294 |
| | | | 455/456.3 |
| 2014/0045482 A1* | 2/2014 | Bisson | G05D 23/1393 |
| | | | 455/420 |
| 2015/0347209 A1* | 12/2015 | Lyubinin | G06F 9/485 |
| | | | 719/313 |
| 2015/0369508 A1* | 12/2015 | Rosen | F24D 19/1087 |
| | | | 165/237 |
| 2016/0025366 A1* | 1/2016 | Snow | F24F 11/30 |
| | | | 700/276 |
| 2016/0037575 A1* | 2/2016 | Evans | H04W 12/068 |
| | | | 455/411 |
| 2016/0073261 A1* | 3/2016 | Hughes, Jr. | H04L 63/08 |
| | | | 455/411 |
| 2016/0335423 A1* | 11/2016 | Beals | G06F 21/31 |
| 2017/0262912 A1* | 9/2017 | Kovalev | G06Q 20/4033 |
| 2017/0350616 A1 | 12/2017 | Yenni et al. | |
| 2018/0062869 A1* | 3/2018 | Nugent | H04L 67/18 |
| 2018/0267701 A1* | 9/2018 | Rigg | G06F 3/0482 |
| 2019/0249896 A1 | 8/2019 | Iyer | |
| 2020/0402334 A1* | 12/2020 | Conrad | G07C 9/00309 |
| 2021/0409960 A1* | 12/2021 | Montalvo | G06N 20/10 |
| 2022/0110551 A1* | 4/2022 | Taub | G01N 33/48792 |

* cited by examiner

REMOTE ACCESS CONTROL OF HVAC SYSTEM

CROSS-REFERENCE TO RELATED APPLICATIONS

This application claims priority from and the benefit of U.S. Provisional Application Ser. No. 62/988,753, entitled "REMOTE ACCESS CONTROL OF HVAC SYSTEM," filed Mar. 12, 2020, which is hereby incorporated by reference in its entirety for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A heating, ventilation, and/or air conditioning (HVAC) system may be used to thermally regulate an environment, such as a building, home, or other structure. During installation and/or maintenance of the HVAC system, a technician may adjust operation of the HVAC system, such as to run an airflow test or to adjust a temperature setting. The technician may be located at the HVAC system while adjusting operation of the HVAC system. In some instances, the technician may be located remotely from the HVAC system and may not be able to observe and address events that occur during the operational adjustment of the HVAC system.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a non-transitory computer-readable storage medium for a heating, ventilation, and/or air conditioning (HVAC) system includes instructions that, when executed by a processor, cause the processor to receive an input indicative of a user location, perform a verification that the user location is within a determined distance from the HVAC system, and control access to system settings of the HVAC system based on the verification.

In another embodiment, a heating, ventilation, and/or air conditioning (HVAC) system includes a thermostat configured to at least partially control operation of the HVAC system and a controller including a processor and a memory. The memory includes instructions that, when executed by the processor, cause the processor to receive an input indicative of a user location, perform a verification that the user location is within a determined distance from the thermostat, and control access to system settings of the HVAC system based on the verification.

In yet another embodiment, a non-transitory computer readable storage medium for a heating, ventilation, and/or air conditioning (HVAC) system includes instructions that, when executed by a processor, cause the processor to receive an input indicative of a user request to access system settings of the HVAC system, receive an input indicative of a user location, determine whether the user location is within a determined distance from the HVAC system, enable access to the system settings of the HVAC system in response to the user location being within the determined distance from the HVAC system, and deny access to the system settings of the HVAC system in response to the user location being outside the determined distance from the HVAC system.

BRIEF DESCRIPTION OF THE DRAWINGS

Various aspects of the present disclosure may be better understood upon reading the following detailed description and upon reference to the drawings, in which.

DETAILED DESCRIPTION

Figure 1:
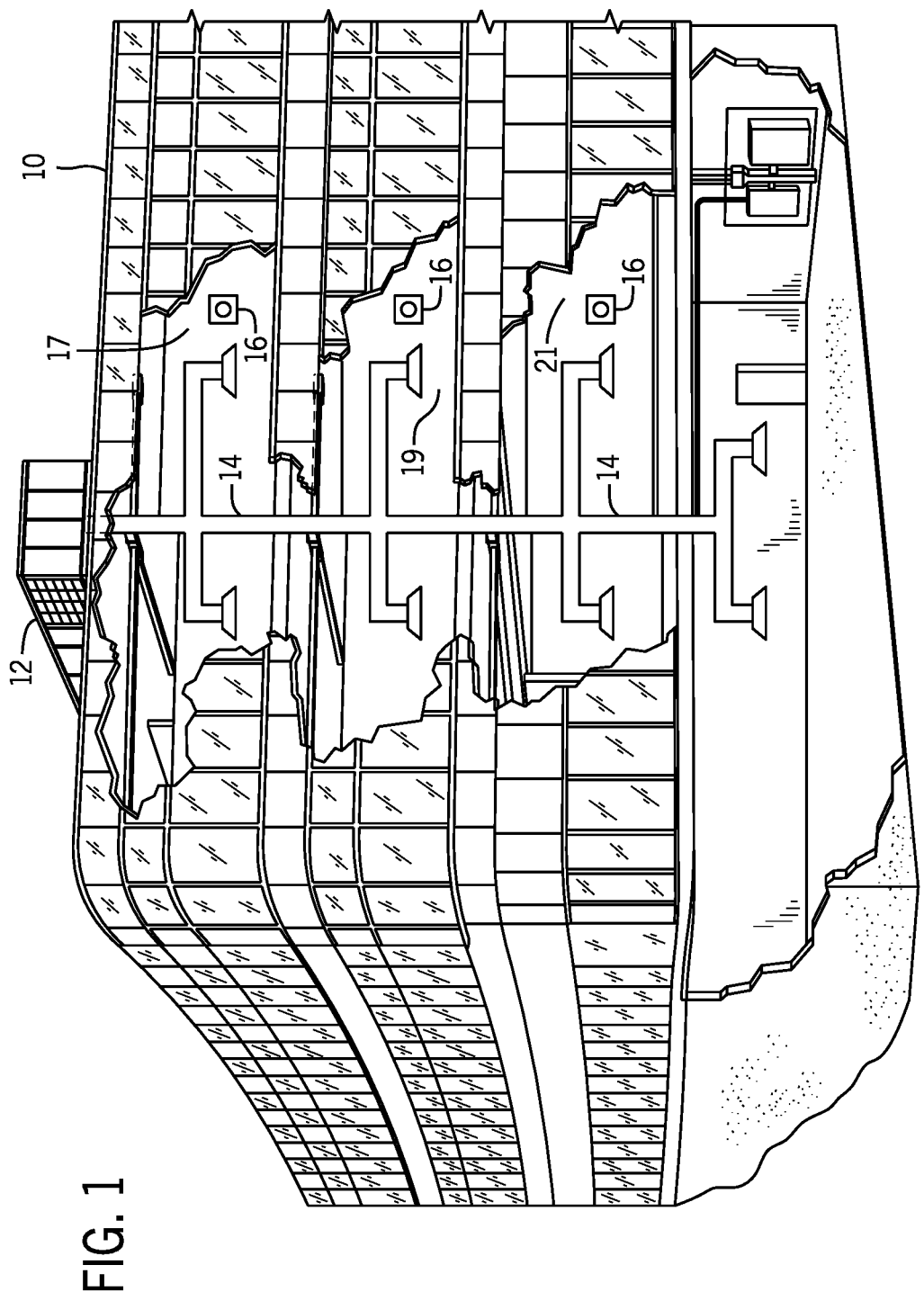
FIG. 1 is a perspective view of an embodiment of a heating, ventilation, and/or air conditioning (HVAC) system for building environmental management that may employ one or more HVAC units, in accordance with an aspect of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Generally, a heating, ventilation, and/or air conditioning (HVAC) system may be used to thermally regulate an environment, such as a building, home, or other structure. During an initial installation of the HVAC system, during installation of new or additional components of the HVAC system, and/or during maintenance of the HVAC system, a user (e.g., a technician, service personnel) may be on site and located near the HVAC system. For example, while performing maintenance of an HVAC system of a home, the user may be at the home and may be moving around or through the home to perform maintenance. In some instances, the user may adjust operation of the HVAC system, such as by adjusting an airflow through the HVAC system, adjusting a temperature setting, adjusting a humidity setting, and/or adjusting other operating parameters of the HVAC system. During the installation or maintenance, the user may move away from the HVAC system. For example, the user may leave the home having the HVAC system. In other instances, the user may be located remotely from the HVAC system while performing the operational adjustment. While located remotely, the user may not be able to observe and/or address events that occur at or within the HVAC system, such as due to operations or adjustments performed by the HVAC system during the installation or maintenance. As a result, the user may be unable to readily address the events, such as by taking a corrective or remedial action.

Accordingly, the present disclosure provides systems and methods for granting access to an HVAC system based on a user being within a predetermined distance from the HVAC system. For example, an access control system of the HVAC system may receive a location of the user and determine whether the user is within the predetermined distance from the HVAC system. Based on the user's location being within the predetermined distance, the access control system may grant access to the HVAC system, such as access to a control system and/or system settings of the HVAC system. Based on the location being outside the predetermined distance, the access control system may deny access to the HVAC system. In certain embodiments, the location of the user may be determined via a global positioning system (GPS), such as via a GPS receiver of a mobile device (e.g., a cell phone, a tablet, a laptop computer). In some embodiments, the location of the user may be determined via a GPS receiver of a vehicle. The location of the HVAC system from which the predetermined distance is calculated or measured may be a location of a thermostat of the HVAC system, a central location of an environment of the HVAC system (e.g., a building, a home, or other structure), or a location of another specific portion of the HVAC system, such as an outdoor unit, an indoor unit or furnace, a rooftop unit, or another portion of the HVAC system.

Control of the HVAC system, such as control of HVAC system settings, enables certain operational adjustments of the HVAC system, such as adjustments to an airflow rate, a fan speed, a temperature setting, a humidity setting, reminder notification(s), an operating mode of the HVAC system, and/or any other suitable system settings. In some embodiments, the access control system may grant different levels of access to the HVAC system, such as a dealer access mode that enables a user to perform tests and/or to make various operational adjustments to the HVAC system, a diagnostic mode that enables the user to view system settings of the HVAC system to diagnose potential issues or events occurring with the HVAC system, and a status mode that enables the user to view a limited amount of information related to the HVAC system (e.g., less information than the diagnostic mode).

As discussed in detail below, the granting of access by the access control system based on the user's location may ensure that the user is located at or adjacent to the HVAC system so that the user is able to observe and/or address potential events at the HVAC system. For example, during operation of the HVAC system and/or while the user is performing an operational adjustment of the HVAC system, certain events may occur, such as a fluid (e.g., refrigerant, air) leak, vibrations of a component of the HVAC system, noise caused by a portion of the HVAC system, and/or other events. The user located at or adjacent to the HVAC system may observe and/or effectively address such events, such as by taking a corrective or remedial action. By way of specific example, while performing an airflow test that adjusts an airflow rate through the HVAC system, the user may notice an air leak occurring at a portion of the HVAC system. In response, the user may stop the airflow test and address the air leak, such as by performing maintenance on a component of the HVAC system. As such, the systems and methods described herein improve/facilitate operation, installation, maintenance, and management of the HVAC system.

Turning now to the drawings, FIG. 1 illustrates an embodiment of a heating, ventilation, and/or air conditioning (HVAC) system for environmental management that may employ one or more HVAC units. As used herein, an HVAC system includes any number of components configured to enable regulation of parameters related to climate characteristics, such as temperature, humidity, air flow, pressure, air quality, and so forth. For example, an "HVAC system" as used herein is defined as conventionally understood and as further described herein. Components or parts of an "HVAC system" may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An "HVAC system" is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

In any case, the HVAC unit 12 may be an air cooled device that implements a refrigeration cycle to provide conditioned air to the building 10. For example, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the air is conditioned, the HVAC unit 12 may supply the conditioned air to the building 10 via ductwork 14 extending throughout the building 10 from the HVAC unit 12. For example, the ductwork 14 may extend to various individual floors or other sections of the building 10. In some embodiments, the HVAC unit 12 may include a heat pump that provides both heating and cooling to the building 10, for example, with one refrigeration circuit implemented to operate in multiple different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other equipment, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and/or the like. Moreover, the control device 16 may include computer systems that are integrated with or separate from other building control or monitoring systems, and even systems that are remote from the building 10. In some embodiments, the HVAC unit 12 may operate in multiple zones of the building and may be coupled to multiple control devices that each control flow of air in a respective zone. For example, a first control device 16 may control the flow of air in a first zone 17 of the building, a second control device 18 may control the flow of air in a second zone 19 of the building, and a third control device 20 may control the flow of air in a third zone 21 of the building.

Figure 2:
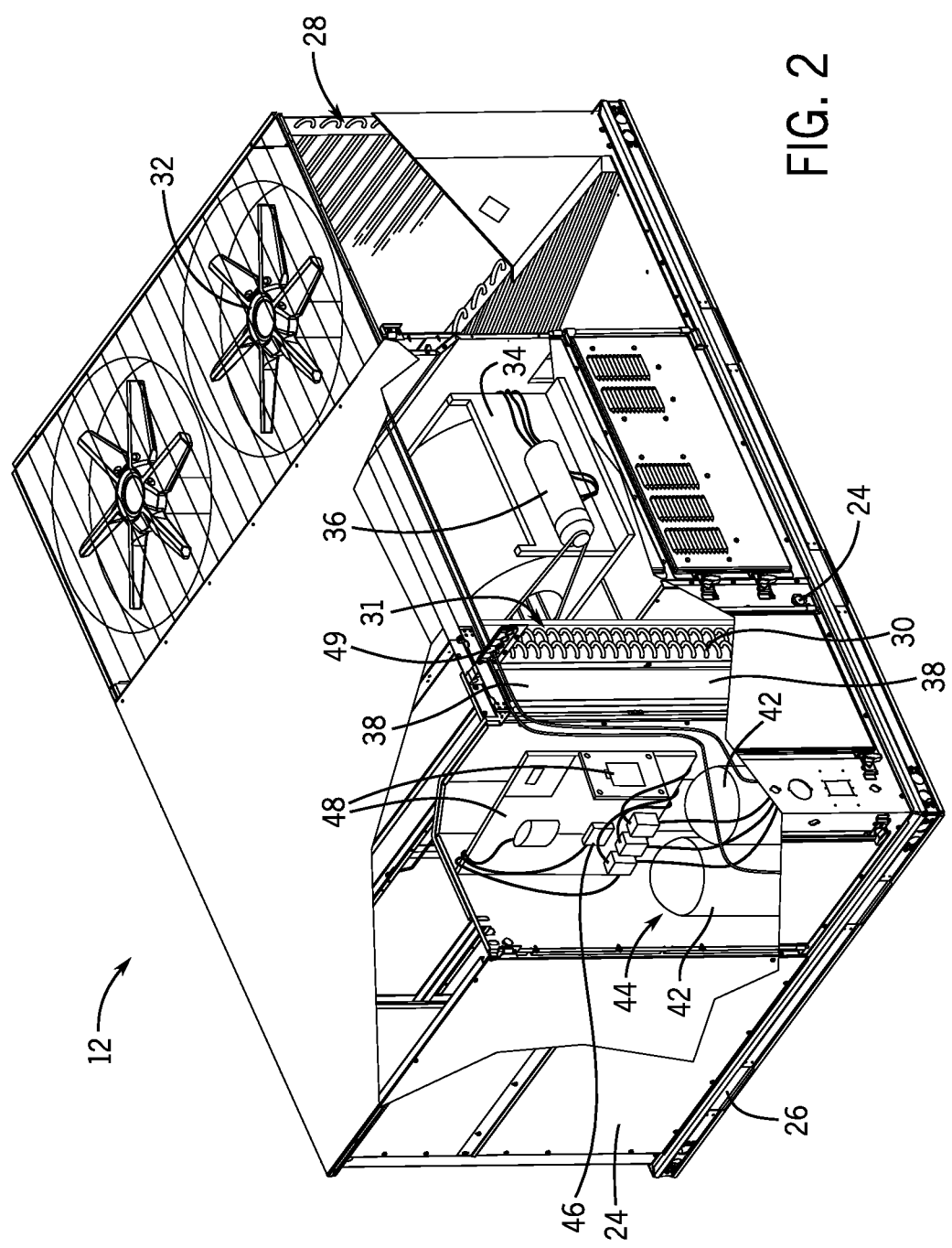
FIG. 2 is a perspective view of an embodiment of a packaged HVAC unit, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 or enclosure encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the HVAC unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board or controller 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
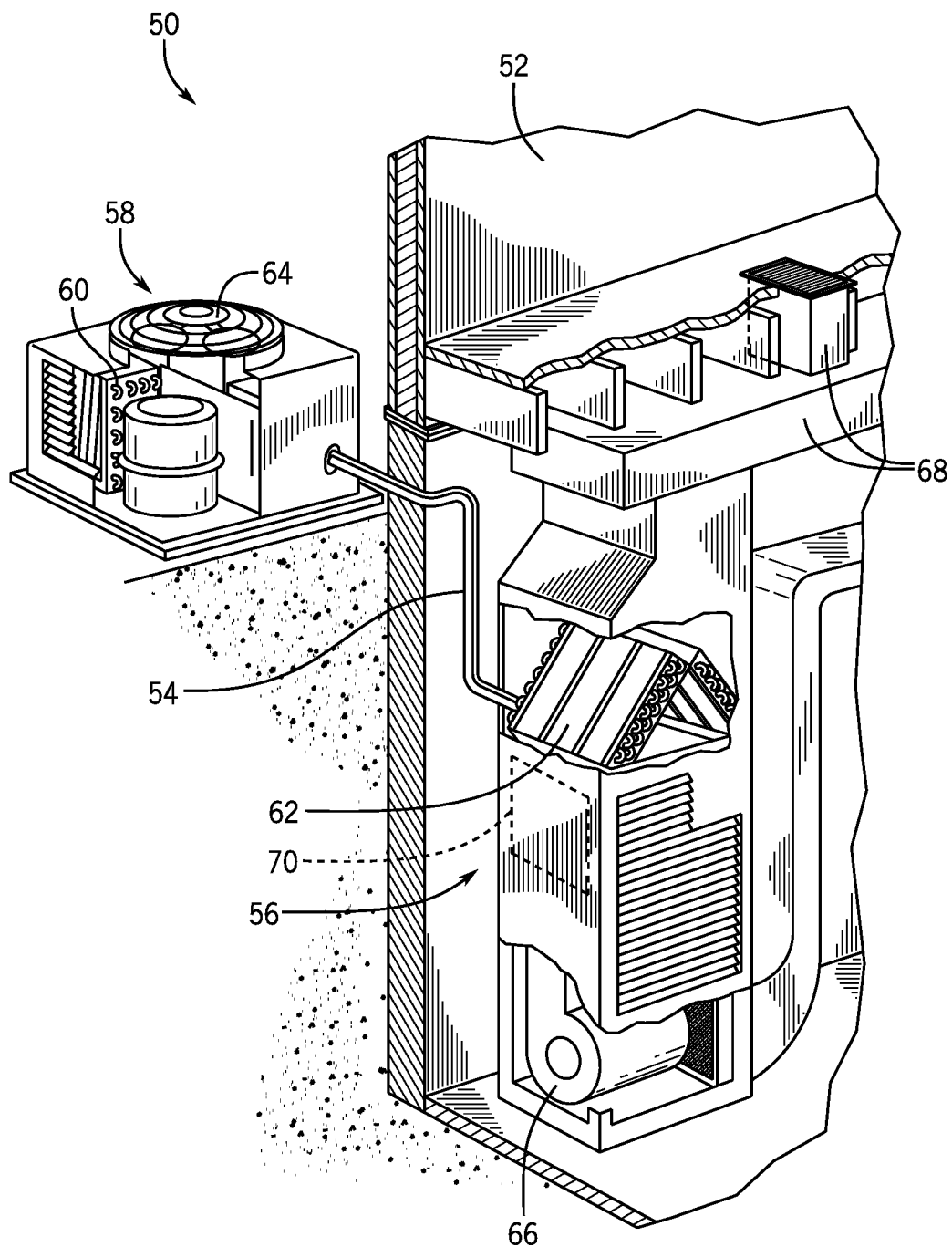
FIG. 3 is a perspective view of an embodiment of a residential, split HVAC system, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit 56 functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or a set point plus a small amount, the residential heating and cooling system 50 may become operative to refrigerate additional air for circulation through the residence 52. When the temperature reaches the set point, or a set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace system 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
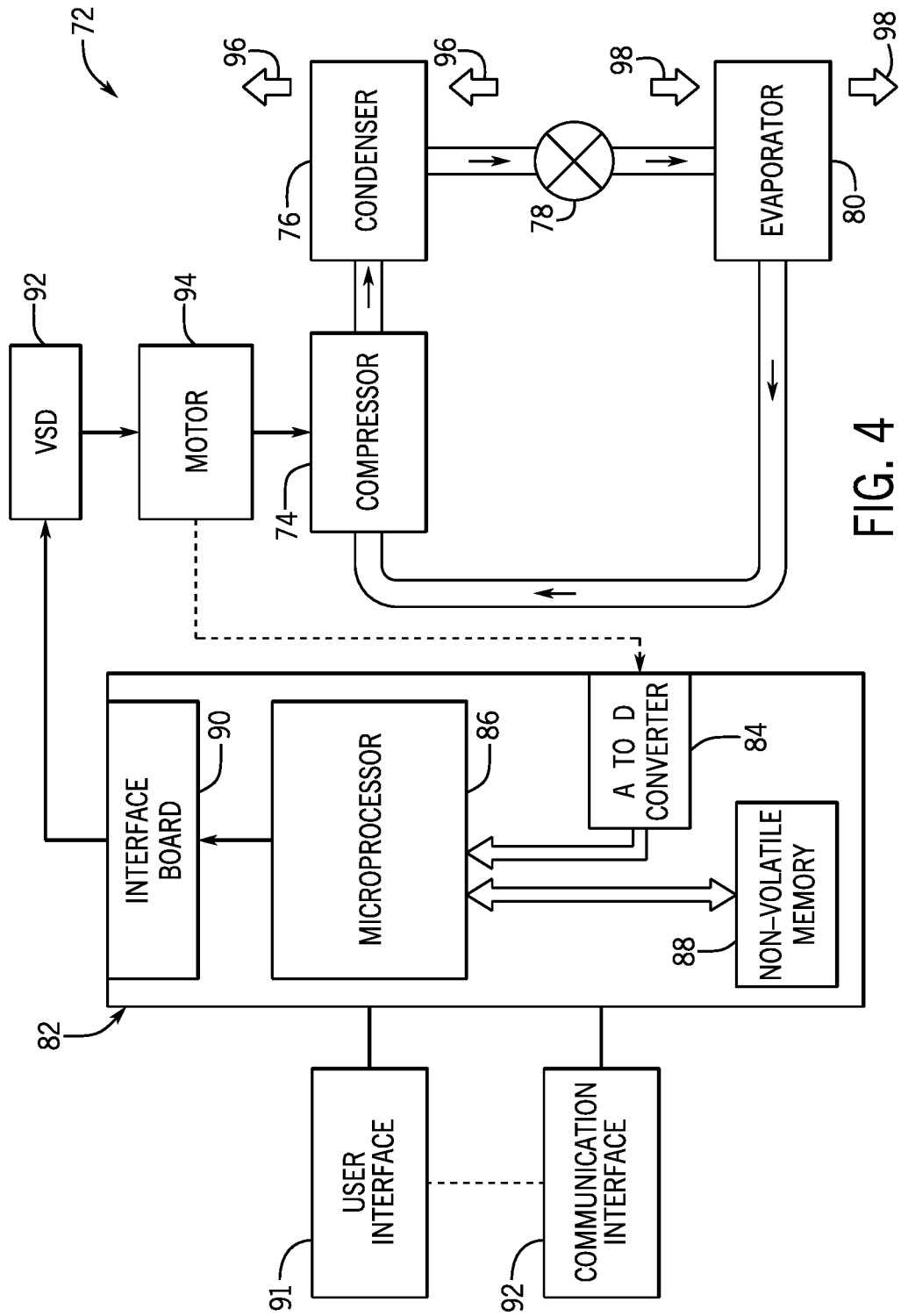
FIG. 4 is a schematic of an embodiment of a vapor compression system that may be used in an HVAC system, in accordance with an aspect of the present disclosure.

FIG. 4 is an embodiment of a vapor compression system 72 that may be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that may be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

The description above with reference to FIGS. 1-4 is intended to be illustrative of the context of the present disclosure. The techniques of the present disclosure may be incorporated with any or all of the features described above, as well as other systems not described above. In particular, as will be discussed in more detail below, the present disclosure provides techniques for controlling access to and/or control of an HVAC system. For example, an access control system of the HVAC system may grant or deny a user access to the HVAC system, such as a control system and/or system settings of the HVAC system, based on the user's location relative to the HVAC system.

Figure 5:
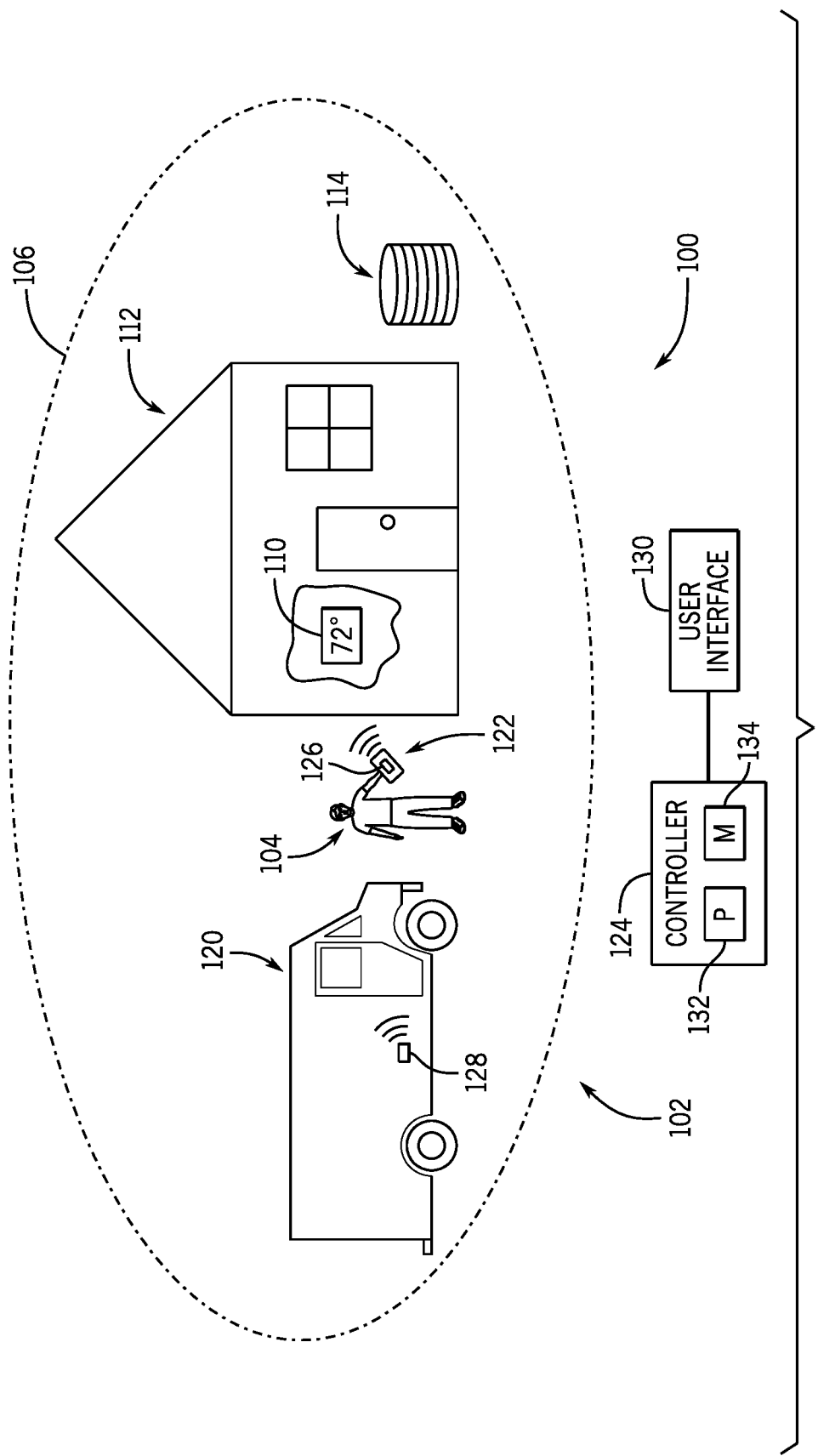
FIG. 5 is a schematic of an embodiment of an access control system that may be used in an HVAC system, in accordance with an aspect of the present disclosure.

To help illustrate, FIG. 5 is a schematic of an HVAC system 100 having an access control system 102 configured to control access to the HVAC system 100, such as access to a control system and/or system settings of the HVAC system 100. As described herein, access to the HVAC system 100 refers to electronic and/or communicative access to the HVAC system 100, such that information related to the HVAC system 100 may be received, operating parameters of the HVAC system 100 may be adjusted or otherwise controlled, electronic communication with the HVAC system 100 is enabled, and so forth. With granted access to the control system of the HVAC system 100, certain operational adjustments of the HVAC system 100 may be performed. The illustrated HVAC system 100 may include embodiments or components of the HVAC unit 12 shown in FIG. 1, embodiments or components of the residential heating and cooling system 50 shown in FIG. 3, a rooftop unit (RTU), or any other suitable HVAC system. As described in greater detail below, a user 104 (e.g., a technician, service personnel) may interact with the HVAC system 100 to perform certain tasks, tests, maintenance procedures, and/or operational adjustments. For example, while performing maintenance of the HVAC system 100, the user 104 may perform a test on or adjust certain setting(s) of the HVAC system 100. Controlled access to the HVAC system 100 based on the location of the user 104 relative to the HVAC system 100 enables improved control of the HVAC system 100. More specifically, granting or denying access to control systems or system settings of the HVAC system 100 based on the user 104 being within a predetermined distance 106 (e.g., a determined distance, a working radius) from the HVAC system 100 may ensure that the user 104 is able to readily observe, monitor, address, and/or correct operations of the HVAC system 100, such as during maintenance or testing procedures. As such, the HVAC system 100 includes the access control system 102 to enable the user 104 to access certain features or systems of the HVAC system 100 when the user 104 is within the predetermined distance 106 from the HVAC system 100.

As illustrated, the HVAC system 100 includes a thermostat 110 positioned within a structure 112 and an outdoor unit 114 positioned outside the structure 112. The HVAC system 100 may generate conditioned air and may circulate conditioned air through the structure 112. The thermostat 110 may provide an interface to enable users (e.g., the user 104 and people in the structure 112) to interact with the HVAC system 100. For example, the thermostat 110 may enable adjustments to system settings of the HVAC system 100, such as adjustments to a temperature set point, a humidity set point, an airflow rate, a fan speed, and/or other operational adjustments. In certain embodiments, the HVAC system 100 may include additional or other components at, within, and/or on the structure 112, such as any of the components described in reference to FIGS. 1-4.

During installation and/or maintenance of the HVAC system 100, the user 104 may not be located at the thermostat 110. For example, the user 104 may be located at the outdoor unit 114, at a vehicle 120 (e.g., a work vehicle), which may be near the structure 112, or elsewhere. In order to enable control and/or adjustment of one or more operating parameters or settings of the HVAC system 100 while not located at the thermostat 110, a mobile device 122 (e.g., a cell phone, a tablet, a laptop computer) may include an application configured to control or adjust one or more parameters of the HVAC system 100 (e.g., via a system settings menu). For example, the user 104 may interact with the mobile device 122 to perform certain operational adjustments of the HVAC system 100, such as to run a test or otherwise adjust system settings of the HVAC system 100. In some embodiments, the mobile device 122 may be configured to communicate with the HVAC system 100, such as via the thermostat 110, to control or adjust one or more operating parameters of the HVAC system 100. The application of the mobile device 122 may also enable the user 104 to view and monitor system settings, operating parameters, and so forth, of the HVAC system 100, such as via a user interface or display of the mobile device 122.

The access control system 102 may control access to the HVAC system 100. For example, the access control system 102 may permit or restrict the user 104 from accessing a control system and/or system settings of the HVAC system 100 via the mobile device 122. In the illustrated embodiment, the access control system 102 includes a controller 124 that may receive an input indicative of a location of the user 104 (e.g., a user location). The location may be determined via a GPS receiver 126, such as a GPS receiver of the mobile device 122, and may be communicated through a network (e.g., a GPS network and/or a cellular network) to the controller 124. The controller 124 may determine whether the location of the user 104 (e.g., the location of the mobile device 122) is within the predetermined distance 106 (e.g., perform a verification that the user 104 is within the predetermined distance 106). Based on a determination that the location of the user 104 is within or at the predetermined distance 106, the controller 124 may grant the user 104 access to information and/or one or more systems of the HVAC system 100. In some embodiments, the controller 124 may grant access to the HVAC system 100 via the mobile device 122 to enable the user 104 to view and/or adjust system settings or operations of the HVAC system 100. Based on a determination that the location of the user 104 is outside or not within the predetermined distance 106, the controller 124 may deny the user 104 access to information and/or systems of the HVAC system 100. Thus, denial of access by the controller 124 may block the user 104 from viewing information and/or adjusting settings or operating parameters of the HVAC system 100. In certain embodiments, the location of the user 104 may be determined via a GPS receiver 128 of the vehicle 120. In such embodiments, the controller 124 is configured to receive feedback indicative of a location of the user 104 from the GPS receiver 128.

In some embodiments, the access control system 102 may grant different levels of access (e.g., access modes). The levels of access may include a dealer mode that enables the user 104 to perform tests and/or to make various operational adjustments to the HVAC system 100 (e.g., to system settings of the HVAC system 100), a diagnostic mode that enables the user 104 to view information of the HVAC system 100 (e.g., system settings) in order to diagnose potential issues or events occurring within the HVAC system 100 without enabling adjustment of settings or operations of the HVAC system 100, and a status mode that enables the user 104 to view a limited amount of information related to the HVAC system 100 (e.g., less information than the diagnostic mode).

The access control system 102 may grant a specific or particular level of access depending on certain factors, such as a type or classification of the user 104. For example, the user 104 may log into an application on the mobile device 122 (e.g., an application configured to communicate with the HVAC system 100), and the user's login information may be associated with a user profile identifying a classification of the user 104 and/or a level of access that may be granted to the user 104. In certain embodiments, the level of access may depend on a distance between the user 104 and the HVAC system 100. For example, while the user 104 is outside or not within the predetermined distance 106 (e.g., based on the user 104 location feedback received by the controller 124), the access control system 102 may grant status mode access to the user 104 or may deny access to the HVAC system 100. After the user 104 moves within the predetermined distance 106, the access control system 102 may grant access (e.g., based on user 104 location feedback received by the controller 124) to the HVAC system 100 in the dealer mode or the diagnostic mode. Access to the HVAC system 100 in the dealer mode or diagnostic mode may enable the user 104 to adjust and/or view HVAC system 100 settings, HVAC system 100 operating parameters, and/or other HVAC system 100 information. In some embodiments, the level of access may depend on a time of day or night during which access is requested by the user 104. For example, the access control system 102 may grant the user 104 access via the dealer mode or the diagnostic mode during the daytime hours (e.g., during normal working hours) but not during nighttime hours.

In certain embodiments, the access control system 102 may grant the user 104 access to operational settings or other information of the HVAC system 100 and/or may grant a specific level of access based on authorization of an owner of the HVAC system 100. For example, if the HVAC system 100 is at a home or residence, the access control system 102 may grant the user 104 particular access to the HVAC system 100 based on approval or authorization received from an owner (e.g., homeowner) of the HVAC system 100. In one embodiment, the user 104 may request access to the HVAC system 100 (e.g., via an application of the mobile device 122), such as a particular level or mode of access that enables the user 104 to adjust system settings or operations of the HVAC system 100. Based on the request, the homeowner of the HVAC system 100 may receive a notification, such as via a personal mobile device of the homeowner, via the thermostat 110, or via another suitable device, that indicates the request of the user 104 to access and/or adjust the HVAC system 100. For example, the controller 124 may cause the personal mobile device of the homeowner to display the notification, via a communication network, in response to receiving the request from the user 104. The homeowner may approve or deny the request of the user 104, and the controller 124 may receive an indication of the homeowner's approval or denial. In response to receiving the homeowner's approval, the controller 124 may approve the request of the user 104 and grant the user 104 access (e.g., via the dealer mode or the diagnostic mode) to the HVAC system 100. In response to receiving the homeowner's denial, the controller 124 may deny the request of the user 104 and deny the user 104 access to the HVAC system 100.

As illustrated, the access control system 102 includes a user interface 130 communicatively coupled to the controller 124. The user interface 130 may be a user interface of the mobile device 122, the thermostat 110, a computing device of a service provider, a computing device of a homeowner and/or the owner of the HVAC system 100, and/or a display of another suitable device. The user interface 130 may display information related to the HVAC system 100, such as system settings that enable operational adjustments to the HVAC system 100. In some embodiments, the user interface 130 may include a graphical user interface ("GUI") that enables a user (e.g., the user 104) to view information related to the HVAC system 100, interact with system settings and/or with the HVAC system 100 generally. In one embodiment, the user interface 130 may be a touch display capable of receiving inputs. The user interface 130 may be any suitable type of display, such as a liquid crystal display (LCD), plasma display, or an organic light emitting diode (OLED) display, for example.

In certain embodiments, the user interface 130 may display an application executable by the mobile device 122 that enables the user 104 to log into a particular user profile. The user 104 may request, via the mobile device 122 and the user interface 130, access to a particular HVAC system (e.g., the HVAC system 100) and/or a particular thermostat (e.g., the thermostat 110). In certain embodiments, the controller 124 may cause the mobile device 122 to display alerts and/or notifications, such as a prompt asking the user 104 whether they are within the predetermined distance 106 from the HVAC system 100. They user 104 may select an option of the prompt indicating that the user 104 is not within the predetermined distance 106 or an option of the prompt indicating that the user 104 is within the predetermined distance 106. In response to receiving an input indicating that the user 104 is not within the predetermined distance 106, the controller 104 may deny the user 104 access to information and/or settings of the HVAC system 100. In response to receiving an input indicating that the user 104 is within the predetermined distance 106, the controller 104 may then receive another input indicating the location of the user 104. For example, the input indicating the location of the user 104 may be received from the GPS receiver 126 to verify the location of the user 104. In response to determining that the user 104 location is not within the predetermined distance 106, the controller 104 may deny access to the HVAC system 100 (e.g., deny access to certain information and/or adjustable parameters of the HVAC system 100). In response to determining that the user 104 location is within the predetermined distance 106, the controller 104 may grant access to the HVAC system 100 (e.g., grant access to certain information and/or adjustable parameters of the HVAC system 100). The controller 124 may cause the mobile device 122 to display a notification indicating the user 104 has been denied or granted access to the HVAC system 100. After granting the user 104 access, the user 104 may view and/or adjust information, operational parameters, and/or other settings of the HVAC system 100.

The access control system 102 may determine the predetermined distance 106 based on a type of the HVAC system 100, a type of the structure 112, a type of thermostat 110, a type of work being performed on the HVAC system 100 (e.g., installation, maintenance), an input provided by an owner of the HVAC system 100 (e.g., the owner may set/adjust a value of the predetermined distance 106), and/or other factors. Additionally, the predetermined distance 106 may be any suitable distance, such as 0.01 miles, 0.02 miles, 0.05 miles, 0.1 miles, 0.2 miles, 0.3 miles, 0.4 miles, 0.5 miles, 0.6 miles, 0.7 miles, 0.8 miles, 0.9 miles, 1 mile, 1.1 miles, 1.2 miles, 1.5 miles, 2 miles, 5 miles, etc.

The controller 124 may be a component of the thermostat 110, a component of the mobile device 122, or a component of an operating system of a service provider, such as a manufacturer, service center, or dealer of the HVAC system 100. In certain embodiments, the mobile device 122, portion(s) of the mobile device 122, the thermostat 110, portion(s) of the thermostat 110, and/or the user interface 130 may be omitted from the access control system 102. Indeed, systems incorporating the features and functionalities described herein may have a variety of configurations to enable and deny access to the HVAC system 100, such as based on a location of the user 104 relative to the HVAC system 100.

The controller 124 may include a processor 132 and a memory 134. The processor 132 may be used to execute software, such as software stored in the memory 134, configured to receive information from the HVAC system 100, send information and/or commands to the HVAC system 100, and/or otherwise adjust and/or control the HVAC system 100. Moreover, the processor 132 may include multiple microprocessors, one or more "general-purpose" microprocessors, one or more special-purpose microprocessors, and/or one or more application specific integrated circuits (ASICS), or some combination thereof. For example, the processor 132 may include one or more reduced instruction set (RISC) or complex instruction set (CISC) processors. The memory 134 may include a volatile memory, such as random access memory (RAM), and/or a nonvolatile memory, such as read-only memory (ROM). The memory 134 may store a variety of information and may be used for various purposes. That is, the memory 134 may store data, executable instructions, and any other suitable data. For example, the memory 134 may store processor-executable instructions, such as firmware or software for controlling the HVAC system 100, for the processor 132 to execute. The memory 134 may also store information related to one or more users 104, such as user profiles that are associated with different users 104 and that designate a particular level or mode of access to be granted for each user 104. The memory 134 may include ROM, flash memory, a hard drive, or any other suitable optical, magnetic, or solid-state storage medium, or a combination thereof.

The processor 132 and/or the memory 134 may be located in any suitable portion of the HVAC system 100. For example, the memory 134 having instructions stored thereon, such as software or firmware for controlling portions of the HVAC system 100, may be located in or associated with the access control system 102 or any suitable control system. The memory 134 may be any suitable article of manufacture that can serve as a medium to store processor-executable code, data, or the like. These articles of manufacture may represent computer-readable medium or any suitable form of memory or storage that may store the processor-executable code used by the processor 132 to perform the presently disclosed techniques. The memory 134 may also be used to store the data and various other software applications. The memory 134 may represent a non-transitory computer-readable storage medium or any suitable form of memory or storage that may store the processor-executable code for execution by the processor 132. It should be noted that "non-transitory" merely indicates that the medium is tangible and not a signal. In certain embodiments, the memory 134 may be a cloud-based memory and/or the controller 124 may access the cloud-based memory.

Figure 6:
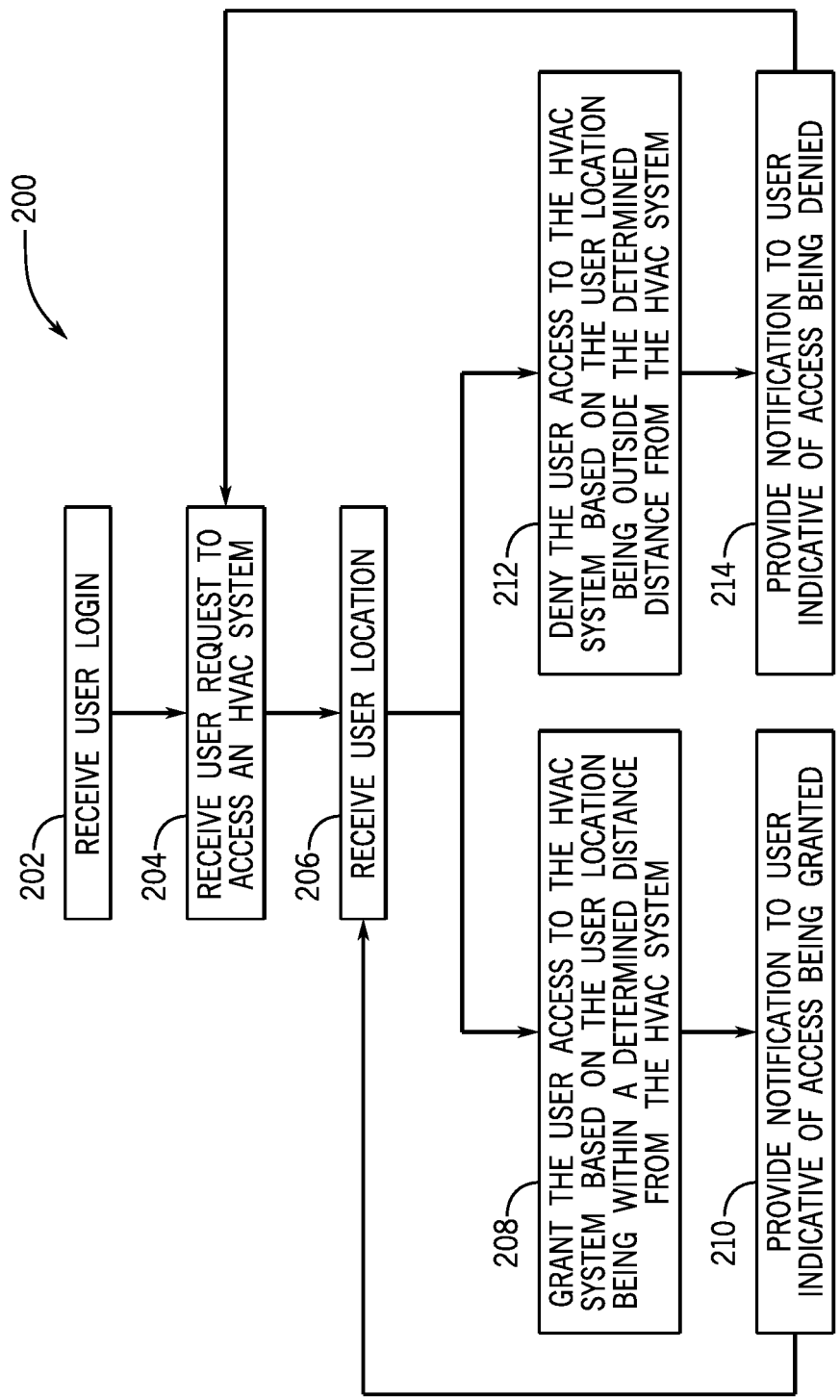
FIG. 6 is a flow diagram of an embodiment of a process for controlling access to an HVAC system, in accordance with an aspect of the present disclosure.

FIG. 6 is a flow diagram of an embodiment of a process 200 for granting and/or denying access to the HVAC system 100. In certain embodiments, the access control system 102 of the HVAC system 100, via the controller 124, may perform some or all steps of the process 200. For example, the process 200 may be stored as instructions (e.g., in the form of software) in the memory 134 of the controller 124, which are executed by the processor 132 of the controller 124. Moreover, while the process 200 illustrates performing certain steps in certain sequence(s), in some embodiments, at least some steps may be performed in a different sequence, some of the steps may be omitted, and/or additional or alternative steps may be included in the process 200. Further, in some embodiments, all steps of the process 200 may be performed by a single controller or control system, while other embodiments may perform the steps of the process 200 with multiple controllers or control systems.

At block 202, the controller 124 may receive login information of the user 104. For example, the user 104 may log into an application executed on the mobile device 122 via the user interface 130. The login information may be communicated to the controller 124 via a cellular network, an Internet connection, and/or other manner of communication. In embodiments with the mobile device 122 including the controller 124, the controller 124 may receive the login information directly from the user interface 130. In certain embodiments, block 202 may be omitted, such that the controller 124 does not receive and/or does not reference the login information of the user 104 to grant or deny access to the user 104.

At block 204, the controller 124 may receive a request of the user 104 to access a particular HVAC system (e.g., the HVAC system 100), such as a control system or system settings of the HVAC system. For example, the user 104, via the user interface 130 of the mobile device 122, may select the HVAC system 100 and/or the thermostat 110 from multiple HVAC systems and/or multiple thermostats located in a particular geographical area. While selecting the particular HVAC system, the user 104 may be within or outside the predetermined distance 106.

At block 206, the controller 124 may receive a location of the user 104, such as a location received via a GPS system and/or a communication network. The location of the user 104 may be determined via the GPS receiver 126 of the mobile device 122, the GPS receiver 128 of the vehicle 120, or by another suitable location sensor that generally indicates a location of the user 104.

At block 208, the controller 124 may grant the user 104 access to the HVAC system 100 (e.g., a control system of the HVAC system 100) based on the location of the user 104 being within the predetermined distance 106. As described above, the controller 124 may determine and/or define a value of the predetermined distance 106 based on a type of the HVAC system 100, a type of the structure 112, a type of the thermostat 110, a type of work being performed on the HVAC system 100 (e.g., installation, maintenance), and/or other factors. Additionally, the controller 124 may determine and/or define the location of the HVAC system 100 as a location of the thermostat 110, a central location of an environment associated with the HVAC system 100 (e.g., a residence serviced by the HVAC system 100), a central location of the structure 112, or a location of another specific portion/component of the HVAC system 100.

At block 210, after granting the user 104 access (e.g., electronic and/or network access) to the HVAC system 100, the controller 124 may provide a notification to the user 104 indicative of access being granted. For example, the controller 124 may cause the mobile device 122 to display a notification indicative of the user's access request being granted. After granting the user 104 access to the HVAC system 100, the user 104 may interact with the HVAC system 100, information associated with the HVAC system 100 (e.g., diagnostic information), operating parameters of the HVAC system 100, operating modes of the HVAC system 100, and so forth. For example, granted access to the HVAC system 100 may enable the user 104 to view and/or modify certain settings (e.g., a temperature set point, a humidity set point, an air flow rate) of the HVAC system 100 and/or to perform certain tests (e.g., performance tests and qualification tests) on the HVAC system 100. In some embodiments, the mobile device 122 executing an application may enable the user 104 to communicate with a control system of the HVAC system 100 to view and/or adjust various settings, operations, and so forth, of the HVAC system 100. In certain embodiments, block 210 may be omitted, such that the controller 124 does not provide a notification indicating the access request being granted. After performing the step of block 210, the controller 124 may return to block 206 and receive the next and/or an additional location of the user 104. For example, the controller 124 may continually and/or periodically receive feedback indicative of a location of the user 104 to verify that the user 104 remains within the predetermined distance 106 after access to the HVAC system 100 is initially granted.

At block 212, the controller 124 may deny the user 104 access to the HVAC system 100 based on the location of the user 104 being outside the predetermined distance 106. At block 214, after denying the user 104 access to the HVAC system 100, the controller 124 may provide a notification to the user 104 indicative of access being denied. In certain embodiments, block 214 may be omitted, such that the controller 124 does not provide a notification indicating the access request being denied.

After denying the user 104 access and/or after providing the notification indicative of denial, the controller 124 may return to block 204 and receive another user request to access the HVAC system 100. For example, the user 104 may view the notification indicative of a previous access request being denied and may request access again. In certain embodiments, the controller 124 may return to block 206 and receive an additional location of the user 104 (e.g., the next user location) to determine if the user 104 has moved to a location within the predetermined distance 106 from the HVAC system 100. In response to determining that the user 104 has moved to a location within the predetermined distance 106 from the HVAC system 100, the controller 124 may proceed to the step of block 208. In response to determining that the user 104 is still outside the predetermined distance 106 from the HVAC system 100, the controller 124 may proceed to the step of block 212.

In certain embodiments, after granting the user 104 access to the HVAC system 100 (e.g., block 208), the controller 124 may receive the additional location of the user 104 (e.g., block 206) and determine that the user 104 is approaching a location that is a distance from the HVAC system 100 approximately equal to the predetermined distance 106, such that the user 104 is about to travel beyond the predetermined distance 106 from the HVAC system 100. In response, the controller 124 may provide a notification, such as via the mobile device 122, indicating that the user 104 is proximate a boundary defined by the predetermined distance 106 from the HVAC system 100. In some embodiments, the controller 124 may determine that the user 104 has just traveled beyond the determined distance 106 (e.g., based on feedback indicative of the user 104 location received via the GPS receiver 126) and provide a notification indicating that the user 104 is beyond the predetermined distance 106 without suspending (e.g., terminating, deactivating) access to the HVAC system 100. For example, the controller 124 may determine that the user 104 has traveled beyond the predetermined distance 106 but is still within a threshold distance (e.g., 1%, 2%, 5%, 10%, 25%, 1 meter, 2 meters, 5 meters, 20 meters, 100 meters, 1 kilometer) of the predetermined distance 106 or has been outside the predetermined distance 106 for a certain amount of time (e.g., 1 second, 2 seconds, 5 seconds, 10 seconds, 30 seconds, 1 minute, 5 minutes, 30 minutes, 1 hour).

In some embodiments, after granting the user 104 access to the HVAC system 100 (e.g., block 208), the controller 124 may proceed to the step of block 212 and deny (e.g., terminate, deactivate) the user's access after an elapsed period of time (e.g., 10 minutes, 30 minutes, 1 hour, 2 hours, 5 hours, 10 hours, 24 hours, 2 days). For example, the period of time may be based on a type of the HVAC system 100, a type of the structure 112, a type of the thermostat 110, a type of work being performed on the HVAC system 100 (e.g., installation, maintenance) when access is initially granted, an input provided by an owner of the HVAC system 100, and/or other factors. Additionally, the controller 124 may cause the mobile device 122 to display a notification to the user 104 indicating that the period of time has expired or is about to expire. After the period of time expires, the controller 124 may return to block 204 and receive another request from the user 104 to access (e.g., re-access) the HVAC system 100.

Providing such alerts/notifications and/or control of the HVAC system 100 may enable the user 104 to access and control the HVAC system 100 when the user 104 is near (e.g., within the predetermined distance 106) the HVAC system 100, thereby enabling the user 104 to observe and/or address certain operational events that may occur at or within the HVAC system 100. As such, the control system 102, via the process 200, enables improved installation and/or maintenance of the HVAC system 100, thereby reducing costs associated with installation and/or maintenance the HVAC system 100.

Figure 7:
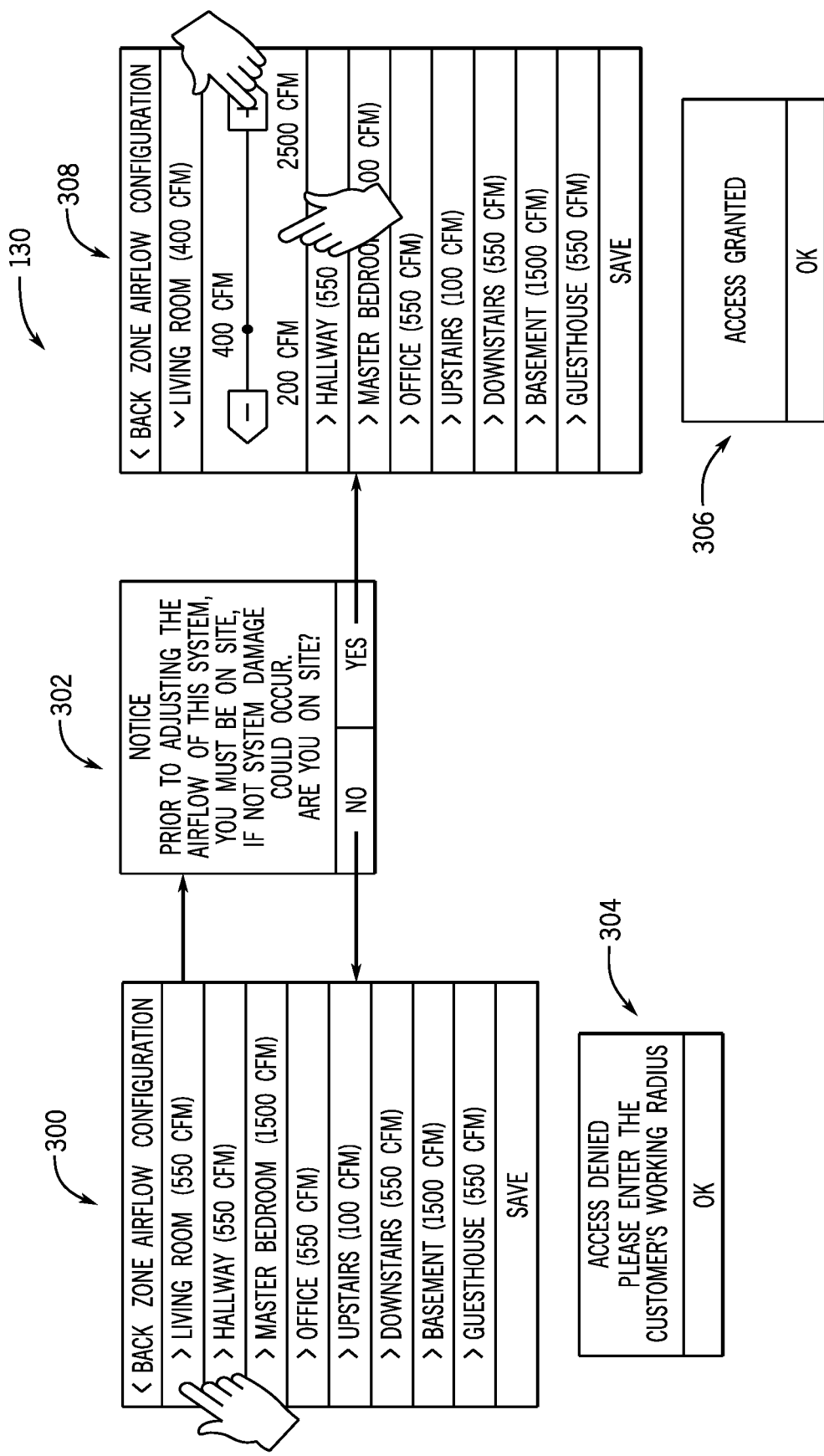
FIG. 7 is a schematic of an embodiment of a graphical user interface of an HVAC system, in accordance with an aspect of the present disclosure.

FIG. 7 is a schematic of an embodiment of the graphical user interface 130 of the HVAC system 100. The graphical user interface 130 may display a system settings menu 300 listing system settings and/or other information related to the HVAC system 100. As described above, the mobile device 122 may include the graphical user interface 130, such that the user 104 may view the system settings menu 300 via the mobile device 122. As illustrated, the system settings menu 300 includes selectable locations of a home that may be associated with and/or that may include components of the HVAC system 100. The system settings menu 300, or portions thereof, may be viewable by the user 104 prior to the user 104 requesting access to some or all of the system settings and/or information listed in the system settings menu 300.

The user 104 may select a particular location (e.g., a zone within the structure 112) from the system settings menu 300, which may initiate the request to access the HVAC system 100 (e.g., to view more details related to the HVAC system 100 and/or to control/adjust parameter of the HVAC system 100). In the illustrated embodiment, a selection of a living room location is indicated. In response, the controller 124 may cause the user interface 130 to display a prompt 302 with selectable options to initiate whether the user 104 is within the predetermined distance 106 from the HVAC system 100. In response to the user 104 selecting "No," the controller 124 may cause the user interface 130 to revert back to the system settings menu 300 and/or may cause the user interface 130 to display a notification 304 indicating that the user's access request is denied.

In response to the user selecting "Yes," the controller 124 may receive feedback indicative of the location of the user 104. In response to the location being outside the predetermined distance 106, the controller 124 may cause the user interface 130 to revert back to the system settings menu 300 and/or may cause the user interface 130 to display the notification 304. In response to the location being within the predetermined distance 106, the controller 124 may cause the user interface 130 to display a notification 306 indicating that the user's access request is granted and/or may display a detailed version 308 of the system settings menu 300 that enables the user 104 to interact with and/or adjust certain operating parameters and/or information of the HVAC system 100.

In the illustrated embodiment, the detailed version 308 of the system settings menu 300 enables the user 104 to adjust an airflow rate at a living room area of the structure 112 or other environment associated with the HVAC system 100. In certain embodiments, the system settings menu 300 may enable the user 104 to adjust and/or view certain other system settings for the living room and/or for other areas of the structure 112 or other environment, such as a temperature set point, a humidity set point, and other system settings. In some embodiments, the system settings menu 300 may display other selectable options, such as certain stages of operation of the HVAC system 100, tests that may be performed by the HVAC system 100, various equipment of the HVAC system 100 (e.g., a condenser, an evaporator, a compressor), and/or other selection options.

Accordingly, the present disclosure provides systems and methods for granting access (e.g., electronic or communicative access) to an HVAC system based on a user being within a predetermined distance from the HVAC system. The disclosed techniques enable improved operation of an HVAC system by ensuring that the user is positioned at or adjacent to the HVAC system in order to observe and address potential events at the HVAC system. For example, the HVAC system may include an access control system that receives a location of the user and determines whether the user is within the predetermined distance from the HVAC system. Based on the location being within the predetermined distance, the access control system may grant access to the HVAC system. Based on the location being outside the predetermined distance, the access control system may deny access to the HVAC system. During operation of the HVAC system and/or while the user is performing an operational adjustment of the HVAC system, certain events may occur, such as a particular operation or response of a component of the HVAC system. The user positioned within the predetermined distance from the HVAC system may observe and/or efficiently address such events. As such, the systems and methods described herein may improve installation and/or maintenance of the HVAC system, thereby reducing costs associated with installation and/or maintenance the HVAC system.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A non-transitory computer-readable storage medium for a heating, ventilation, and/or air conditioning (HVAC) system comprising instructions that, when executed by a processor, cause the processor to: receive an input indicative of a user request to access a first predefined version of a system settings menu of the HVAC system; receive an input indicative of a user location; output a first signal to enable access to a first mode of the HVAC system in response to a determination that the user location is within a determined distance from the HVAC system, wherein the first mode comprises access to the first predefined version of the system settings menu of the HVAC system, and cause a user interface to display the first predefined version of the system settings menu of the HVAC system; block access to the first mode of the HVAC system and the first predefined version of the system settings menu of the HVAC system after a period of time since enabling access to the first mode of the HVAC system is elapsed, and output a second signal to enable access to a second mode of the HVAC system in response to a determination that the user location is not within the determined distance from the HVAC system, wherein the second mode comprises access to a second predefined version of the system settings menu of the HVAC system, and cause the user interface to display the second predefined version of the system settings menu of the HVAC system, wherein the first mode comprises a dealer mode, a diagnostic mode, or both, the second mode comprises a status mode, and the second predefined version of the system settings menu is configured to enable viewing of less information than the first predefined version of the system settings menu.

2. The computer-readable storage medium of claim 1, wherein the instructions, when executed by the processor, cause the processor to receive the input indicative of the user location from a global positioning system (GPS).

3. The computer-readable storage medium of claim 2, wherein the global positioning system (GPS) is a component of a mobile device having the non-transitory computer-readable storage medium.

4. The computer-readable storage medium of claim 1, wherein the determined distance is calculated based on a location of a thermostat of the HVAC system.

5. The computer-readable storage medium of claim 1, wherein the determined distance is one mile or less.

6. The computer-readable storage medium of claim 1, wherein the instructions, when executed by the processor, cause the processor to:
receive an input indicative of a homeowner authorization; and
enable access to the first mode of the HVAC system based on the homeowner authorization.

7. The computer-readable storage medium of claim 6, wherein the instructions, when executed by the processor, cause the processor to output a signal to cause a user device to provide a prompt configured to receive the homeowner authorization.

8. The computer-readable storage medium of claim 1, wherein the instructions, when executed by the processor, cause the processor to output a third signal to cause the user interface to display a notification indicative of blocked access to the first mode of the HVAC system in response to the determination that the user location is not within the determined distance from the HVAC system.

9. The computer-readable storage medium of claim 1, wherein the instructions, when executed by the processor, cause the processor to determine the period of time based on a type of the HVAC system, a type of thermostat of the HVAC system, a type of work to be performed on the HVAC system, an input provided by an owner of the HVAC system, or a combination thereof.

10. The computer-readable storage medium of claim 1, wherein the first predefined version of the system settings menu is configured to enable viewing of one or more settings of the HVAC system and enable adjustment of the one or more settings of the HVAC system, and the second predefined version of the system settings menu is configured to enable viewing of the one or more settings of the HVAC system and block adjustment of the one or more settings of the HVAC system.

11. The computer-readable storage medium of claim 10, wherein the instructions, when executed by the processor, cause the processor to determine the determined distance based on at least two of: a type of the HVAC system, a type of thermostat of the HVAC system, a type of work to be performed on the HVAC system, and an input provided by an owner of the HVAC system.

12. A heating, ventilation, and/or air conditioning (HVAC) system, comprising: a thermostat configured to at least partially control operation of the HVAC system; and a controller comprising a processor and a memory, wherein the memory comprises instructions that, when executed by the processor, cause the processor to: receive an input indicative of a user request to access a first predefined version of a system settings menu of the HVAC system; receive an input indicative of a user location; output a first signal to enable access to a first mode of the HVAC system in response to a determination that the user location is within a determined distance from the HVAC system, wherein the first mode comprises a dealer mode, a diagnostic mode, or both, configured to enable access to the first predefined version of the system settings menu of the HVAC system, and cause a user interface to display the first predefined version of the system settings menu of the HVAC system; block access to the first mode of the HVAC system and the first predefined version of the system settings menu of the HVAC system after a period of time since allowing access to the first mode of the HVAC system is elapsed; and output a second signal to enable access to a second mode of the HVAC system in response to a determination that the user location is not within the determined distance from the HVAC system, wherein the second mode comprises a status mode configured to enable access to a second predefined version of the system settings menu of the HVAC system, and cause the user interface to display the second predefined version of the system settings menu of the HVAC system, wherein the second predefined version of the system settings menu is configured to enable viewing of less information than the first predefined version of the system settings menu.

13. The HVAC system of claim 12, wherein the first mode is configured to enable adjustment of equipment settings of the HVAC system.

14. The HVAC system of claim 13, wherein the thermostat comprises a graphical user interface configured to display the first predefined version of the system settings menu.

15. The HVAC system of claim 12, wherein the instructions, when executed by the processor, cause the processor to:
receive an input indicative of a homeowner authorization; and
enable access to the first mode of the HVAC system based on the homeowner authorization.

16. A non-transitory computer-readable storage medium for a heating, ventilation, and/or air conditioning (HVAC) system comprising instructions that, when executed by a processor, cause the processor to: receive an input indicative of a user request to access a first predefined version of a system settings menu of the HVAC system; receive an input indicative of a user location; output a first signal to enable access to the first predefined version of the system settings menu of the HVAC system in a first mode and to cause a user interface to display the first predefined version of the system settings menu of the HVAC system in response to a determination that the user location is within a determined distance from the HVAC system; deny access to the first predefined version of the system settings menu of the HVAC system after a period of time since allowing access to the first predefined version of the system settings menu of the HVAC system is elapsed; and output a second signal to enable access to a second predefined version of the system settings menu of the HVAC system in a second mode in response to a determination that the user location is not within the determined distance from the HVAC system, wherein the second predefined version of the system settings menu is configured to enable viewing of less information than the first predefined version of the system settings menu,
wherein the first mode comprises a dealer mode, a diagnostic mode, or both, and the second mode comprises a status mode.

17. The computer-readable storage medium of claim 16, wherein the instructions, when executed by the processor, cause the processor to receive the input indicative of the user location from a global positioning system (GPS).

18. The computer-readable storage medium of claim 17, wherein the global positioning system (GPS) is a component of a mobile device having the non-transitory computer-readable storage medium.

19. The computer-readable storage medium of claim 16, wherein the instructions, when executed by the processor, cause the processor to:
receive an input indicative of an additional user location after outputting the first signal to enable access to the first predefined version of the system settings menu of the HVAC system and cause the user interface to display the first predefined version of the system settings menu of the HVAC system; and deny access to the first predefined version of the system settings menu of the HVAC system in response to a determination that the additional user location is not within the determined distance from the HVAC system.

* * * * *